(12) United States Patent
Zinck et al.

(10) Patent No.: US 9,023,538 B2
(45) Date of Patent: May 5, 2015

(54) ELECTROLYTE FOR ELECTROCHEMICAL BATTERY CELL AND BATTERY CELL CONTAINING THE ELECTROLYTE

(71) Applicant: Alevo Research AG, Zug (CH)

(72) Inventors: Laurent Zinck, Mothern (FR); Christian Pszolla, Karlsruhe (DE); Claus Dambach, Pfinztal (DE)

(73) Assignee: Alevo Research AG, Zug (CH)

( * ) Notice: Subject to any disclaimer, the term of this patent is extended or adjusted under 35 U.S.C. 154(b) by 94 days.

(21) Appl. No.: 13/797,049

(22) Filed: Mar. 12, 2013

(65) Prior Publication Data

US 2014/0220428 A1 Aug. 7, 2014

Related U.S. Application Data

(63) Continuation of application No. PCT/EP2013/000366, filed on Feb. 7, 2013.

(51) Int. Cl.

| | |
|---|---|
| *H01M 10/0563* | (2010.01) |
| *H01M 6/16* | (2006.01) |
| *H01M 4/587* | (2010.01) |
| *H01M 10/0525* | (2010.01) |
| *H01M 10/05* | (2010.01) |
| *H01M 10/052* | (2010.01) |
| *H01M 4/58* | (2010.01) |
| *H01M 10/054* | (2010.01) |

(52) U.S. Cl.
CPC .......... *H01M 10/0563* (2013.01); *H01M 10/05* (2013.01); *H01M 4/5825* (2013.01); *H01M 4/587* (2013.01); *H01M 10/052* (2013.01); *H01M 10/0525* (2013.01); *H01M 10/054* (2013.01); *H01M 2300/002* (2013.01)

(58) Field of Classification Search
None
See application file for complete search history.

(56) References Cited

U.S. PATENT DOCUMENTS

| | | | |
|---|---|---|---|
| 4,513,067 A | 4/1985 | Kuio et al. | |
| 4,515,875 A | 5/1985 | Bowden et al. | |
| 4,891,281 A | 1/1990 | Kuo et al. | |
| 4,925,753 A | 5/1990 | Schlaikjer | |
| 5,145,755 A | 9/1992 | Schlaikjer et al. | |
| 8,410,759 B2 | 4/2013 | Zinck et al. | |
| 8,858,655 B2 | 10/2014 | Hambitzer et al. | |
| 2007/0065714 A1* | 3/2007 | Hambitzer et al. | 429/66 |
| 2010/0062341 A1 | 3/2010 | Hambitzer | |
| 2011/0287304 A1 | 11/2011 | Zinck et al. | |
| 2012/0308876 A1 | 12/2012 | Hambitzer et al. | |

FOREIGN PATENT DOCUMENTS

| | | |
|---|---|---|
| FR | 2 531 574 A1 | 2/1984 |
| WO | WO 2005/031908 A2 | 4/2005 |

OTHER PUBLICATIONS

I.R. Hill et al. "Dehydroxylation of LiAICl4—xSO2 Electrolytes Using Chlorine" J. Electrochem. Soc. vol. 143, No. 11, Nov. 1996, pp. 3585-3590.*
David Linden (Editor in Chief), "Handbook of Batteries," Second Edition, McGraw-Hill, 1994, pp. 36.25-36.28.
D.L. Foster et al., "New Highly Conductive Inorganic Electrolytes," J. Electrochem. Soc., 1988, pp. 2682-2686.
L. Zinck et al., Purification Process for an Inorganic Rechargeable Lithium Battery and New Safety Concepts, Journal of Applied Electrochemistry (2006), vol. 36, No. 11, pp. 1291-1295.

* cited by examiner

*Primary Examiner* — Gregg Cantelmo
(74) *Attorney, Agent, or Firm* — Bose McKinney & Evans LLP

(57) ABSTRACT

Electrolyte for an electrochemical battery cell, containing sulfur dioxide and a conductive salt. Improved characteristics of a cell filled with the electrolyte are achieved in that the molar concentration of hydroxide groups in the electrolyte is at most 50 mmol per liter and the molar concentration of chlorosulfonate groups in the electrolyte is at most 350 mmol per liter.

16 Claims, 5 Drawing Sheets

ELECTROLYTE FOR ELECTROCHEMICAL BATTERY CELL AND BATTERY CELL CONTAINING THE ELECTROLYTE

RELATED APPLICATIONS

This application is a continuation of PCT/EP2013/000366, filed Feb. 7, 2013, the entire disclosure of which is hereby incorporated by reference in its entirety.

BACKGROUND

The invention concerns an electrolyte for an electrochemical battery cell. The electrolyte contains sulfur dioxide and a conductive salt. The invention also refers to a process for manufacturing the electrolyte and a battery cell containing the electrolyte.

Rechargeable battery cells are of great importance in many technical fields. Development goals are in particular a high energy density (charge capacity per unit of weight and volume), a high charging and discharging current (low internal resistance), a long service life with a large number of charging and discharging cycles, very good operating safety and the lowest possible costs.

The electrolyte is an important functional element of every battery cell. It contains a conductive salt and is in contact with the positive and negative electrodes of the battery cell. At least one ion of the conductive salt (anion or cation) has such mobility in the electrolyte that the charge transport between the electrodes, which is required for functioning of the cell, can take place by ion conduction.

SUMMARY

An $SO_2$-based electrolyte is used according to the invention. In the context of the invention, this term designates an electrolyte containing sulfur dioxide not just in low concentration as an additive, but in which the $SO_2$ at least to some degree enables the mobility of the ions of the conductive salt contained in the electrolyte, thus ensuring the charge transport. The electrolyte preferably contains at least 20 percent by weight ("wt. %") $SO_2$, values of 35 wt. % $SO_2$, 45 wt. % $SO_2$ and 55 wt. % $SO_2$, relative to the overall quantity of the electrolyte contained in the cell, being further preferred in this order. The electrolyte can also contain up to 95 wt. % $SO_2$, maximum values of 85 wt. % and 75 wt. % [obvious error in German text: "75 wt. % and 85 wt. %"] being preferred in this order.

The electrolyte is preferably used in an alkali metal cell where the active metal is an alkali metal. However, the active metal may also be an alkaline earth metal or a metal from the second subgroup of the periodic table. The term active metal designates the metal whose ions migrate to the negative or positive electrode within the electrolyte during charging or discharging of the cell and participate there in electrochemical processes that lead directly or indirectly to the transfer of electrons into or out of the external circuit. The active metal is preferably lithium, sodium, calcium, zinc or aluminum, lithium being particularly preferred. Lithium cells with an $SO_2$-based electrolyte are designated as Li—$SO_2$ cells. By way of example (but without limiting the generality), reference will be made hereafter to lithium as the active metal of the negative electrode.

In the case of an alkali metal cell, a tetrahalogenoaluminate is preferably used as the conductive salt, particularly preferably a tetrachloroaluminate of the alkali metal, such as $LiAlCl_4$. Further preferred conductive salts are aluminates, halogenides, oxalates, borates, phosphates, arsenates and gallates of an alkali metal, in particular of lithium.

Since many years there have been discussions about $SO_2$-based electrolytes for lithium cells. In D1 "Handbook of Batteries", David Linden (Editor), 2nd edition, McGraw-Hill, 1994 the high ionic conductivity of an $SO_2$-based inorganic electrolyte is emphasized. It is stated that this electrolyte is also advantageous with respect to other electrical data. It is further stated therein that systems with an $SO_2$-based electrolyte have been under investigation for a long time and are of interest for special applications, but that the further commercial applicability is restricted, in particular since the electrolyte is highly corrosive.

An advantage of the $SO_2$-based electrolyte is that—in contrast to the organic electrolytes of the lithium-ion cells common in practice—it cannot burn. The known safety risks of lithium-ion cells are mainly caused by their organic electrolytes. If a lithium-ion cell catches fire or even explodes, the organic solvent of the electrolyte forms the combustible material. An electrolyte according to the invention is preferably essentially free of organic materials, whereby "essentially free" is to be construed such that the quantity of any organic materials present is so small that they do not represent any safety risk.

On this basis, the invention addresses the technical problem of making available an $SO_2$-based electrolyte which—while maintaining the advantageous characteristics of such electrolytes—leads to improved electrical characteristics of an electrochemical battery cell filled with the electrolyte.

The problem is solved by an electrolyte according to claim 1. In the electrolyte, the content of compounds containing a hydroxide group ($OH^-$) is so low that the molar concentration of hydroxide groups in the electrolyte is at most 50 mmol (millimol) per liter. At the same time, the content of compounds containing a chlorosulfonate group ($SO_3Cl^-$) is so low that the molar concentration of chlorosulfonate groups in the electrolyte is at most 350 mmol per liter.

An $SO_2$-based electrolyte is usually produced by mixing the Lewis acid component and Lewis base component of the conductive salt with each other and allowing them to react with gaseous $SO_2$ that is allowed to flow over or through the mixture. In an exothermic reaction, a Lewis acid/Lewis base adduct is formed which is dissolved in $SO_2$, e.g.: $LiCl + AlCl_3 \rightarrow LiAlCl_4$. When the conductive salt dissolves in $SO_2$ its ions become mobile, e.g. $Li^+$ and $AlCl_4^-$.

This process is described in the literature, for example in
D2 U.S. Pat. No. 4,891,281 and
D3 D. L. Foster et al: "New Highly Conductive Inorganic Electrolytes", J. Electrochem. Soc., 1988, 2682-2686.

A problem that has already been discussed for a long time is that during production of the electrolyte, traces of water are dragged in which react to produce hydrolysis products, said hydrolysis products containing hydroxide groups. The following reaction takes place, for example:

$$H_2O + LiAlCl_4 \rightarrow AlCl_3OH^- + Li^+ + HCl \qquad (A)$$

The following publications address this problem:
D4 U.S. Pat. No. 4,925,753

In the cell described here, the $SO_2$ serves both as a solvent of the conductive salt and as a liquid cathode. The document describes how moisture and hydrolysis products are dragged into the electrolyte by the starting materials and lead to increased corrosion of the cell components, in particular the lithium anode. In order to avoid moisture being dragged in, one Lewis component (alkali metal salt) is dried at 200 degrees Celsius for 16 hours and the other Lewis component (aluminum chloride) is freshly sublimated. In addition, the concentration of aluminum is increased (e.g. by increasing the concentration of $LiAlCl_4$) in order to achieve a higher starting capacity during operation of the cell. A calcium salt of the same anion is added additionally which serves as an "antifreeze agent", compensating an increase in the freezing temperature of the electrolyte caused by the increased concentration of $LiAlCl_4$.

D5 U.S. Pat. No. 5,145,755

This document describes the study of an electrolyte produced according to D 4 by means of IR spectral analysis. This shows a strong and wide absorption band in the area of the OH oscillation. The cleaning effect of the process described in D4 is thus insufficient. A different method for removing hydrolysis products from the electrolyte solution is described in D5. Here, the starting salts (Lewis acid and Lewis base) are mixed and heated with sulfuryl chloride under reflux to 90° C. The salt mixture is then melted to 120° C. to 150° C. to remove the sulfuryl chloride. By feeding $SO_2$ gas to the salt mixture, an electrolyte is produced that is said to be essentially free of hydrolysis products.

D6 I. R. Hill and R. J. Dore: "Dehydroxylation of $LiAlCl_4.xSO_2$ Electrolytes Using Chlorine", J. Electrochem. Soc., 1996, 3585-3590

This publication describes as an introduction the previous attempts of dehydroxylation of $SO_2$-based electrolytes. It is explained that a significant disadvantage of this electrolyte type is that it normally contains hydroxide contamination and that the previous attempts to eliminate this contamination were insufficient. On the basis of the fact that the required dehydroxylation cannot be achieved by heating, the authors conclude that chemical treatment is required. With respect to the dehydroxylation by means of sulfuryl chloride described in D5, they criticize the fact that recontamination with water can occur when the electrolyte is produced using the cleaned salt. For this reason, they say that dehydroxylation of the $LiAlCl_4.xSO_2$ electrolyte should be preferred. To this end the document compares two processes where the electrolyte is treated with sulfuryl chloride ($SO_2Cl_2$) and chlorine gas ($Cl_2$) respectively. It is stated that both processes allow sufficient dehydroxylation. The chlorine gas method is seen as the preferred method. As shown in the IR spectra in the document, chlorosulfonate groups are produced in both processes which replace the hydroxide groups. The electrochemical activity of the chlorosulfonate groups is investigated by observing the intensity of the corresponding infrared bands during extensive discharge of the cell. It is stated that the intensity of the bands does not decrease and that consequently the chlorosulfonate groups do not participate in the cell reactions.

In the context of the invention, it was established that $(SO_3Cl)^-$ which is inevitably produced in the known processes for removal of compounds containing hydroxides, significantly impairs functioning of the cell and that a considerable improvement, in particular with respect to the charging capacity of the cell and its usability for a large number of charging and discharging cycles, is achieved if not only the molar concentration (also designated as mole number) of hydroxide groups in the electrolyte is below 50 mmol per liter, but simultaneously the molar concentration of chlorosulfonate groups in the electrolyte does not exceed a maximum value of 350 mmol per liter. Particularly good results are achieved if the molar concentration of hydroxide groups in the electrolyte is at most 45 mmol per liter, preferably at most 25 mmol per liter, further preferably at most 15 mmol per liter and particularly preferably at most 5 mmol per liter. With respect to the molar concentration of chlorosulfonate groups in the electrolyte, it is particularly advantageous if its maximum value does not exceed 250 mmol per liter, preferably 200 mmol per liter and particularly preferably 150 mmol per liter.

As already described, hydroxide groups can be produced by water traces being dragged into the starting materials for electrolyte production or into the electrolyte itself. According to reaction equation (A), the water can react with the electrolyte to produce the hydroxide-containing compound $AlCl_3OH^-$. However, other hydroxide-containing compounds can also be produced. All hydroxide-containing compounds can be detected using infrared spectroscopy by way of the OH oscillation at a wavenumber of around 3350 cm$^{-1}$. In contrast to infrared spectroscopy, the known Karl Fischer method for analysis of water traces is not suitable for determination of hydroxide-containing compounds in the electrolyte. In addition to hydroxide-containing compounds such as $AlCl_3OH^-$, the Karl Fischer method also detects oxide-containing compounds of the electrolyte such as AlOCl. A high Karl Fischer value therefore does not correspond to a high concentration of hydroxide-containing compounds.

Compounds containing chlorosulfonate groups are produced, for example, by the reaction of chlorine with hydroxide-containing compounds of the electrolyte solution according to

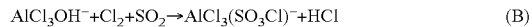

$$AlCl_3OH^- + Cl_2 + SO_2 \rightarrow AlCl_3(SO_3Cl)^- + HCl \qquad (B)$$

Compounds containing chlorosulfonate groups can be detected in the electrolyte by means of infrared spectroscopy. Three bands at wavenumbers of approximately 665 cm$^{-1}$, 1070 cm$^{-1}$ and 1215 cm$^{-1}$ are characteristic for the presence of compounds with chlorosulfonate groups.

The preferred percentages by weight of $SO_2$ in the overall quantity of the electrolyte contained in the cell have already been stated. The percentage by weight of the conductive salt in the electrolyte should preferably be less than 70%, values of less than 60, 50, 40, 30, 20 and 10 wt. % being further preferred in this order.

The electrolyte should preferably comprise mainly the $SO_2$ and the conductive salt. The percentage by weight of $SO_2$ plus conductive salt referred to the overall weight of the electrolyte in the cell should preferably be more than 50 wt. %, values of more than 60, 70, 80, 85, 90, 95 and 99% being further preferred in this order.

Several different salts may be dissolved in the electrolyte such that at least one of their ions is mobile in the electrolyte and contributes by ion conduction to the charge transport required for functioning of the cell, so that the salt acts as a conductive salt. The fraction of salts whose cation is the cation of the active metal preferably predominates. Referred to the mole number of all salts dissolved in the electrolyte, the mole fraction of dissolved salts with a cation different from the cation of the active metal in the electrolyte should be at most 30 mol %, values of at most 20 mol %, 10 mol %, 5 mol % and 1 mol % being further preferred in this order.

With respect to the molar relation of conductive salt and sulfur dioxide, it is preferred that the electrolyte contains at least 1 mole of $SO_2$ per mole of conductive salt, with values of 2, 3, 4 and 6 moles of $SO_2$ per mole of conductive salt being further preferred in this order. Very high molar fractions of $SO_2$ are possible. The preferred upper limit can be specified as 50 moles of $SO_2$ per mole of conductive salt and upper limits of 25 and 10 moles of $SO_2$ per mole of conductive salt are further preferred in this order.

As explained above, the electrolyte according to the invention is preferably essentially free of organic materials. However, this does not exclude some embodiments of the invention also containing organic materials in the electrolyte, such as one or a plurality of organic co-solvents. In such an embodiment, however, the overall quantity of the organic material in the electrolyte should in any case be less than 50 wt. %, with values of less than 40, 30, 20, 15, 10, 5, 1 and 0.5 wt. %, relative to the total weight of the electrolyte, being further preferred in this order. According to a further preferred embodiment, the organic material has a flash point of less than 200° C., with values of 150, 100, 50, 25 and 10° C. being further preferred in this order.

According to a further preferred embodiment, the electrolyte contains two or more organic materials, the organic materials having an average (calculated from the weight ratio) flash point of less than 200° C., values of 150, 100, 50, and 10° C. being further preferred in this order.

A process suitable for production of an electrolyte according to the invention is characterized by the following steps:
- A Lewis acid, a Lewis base and aluminum are mixed in solid form.
- The mixture is kept at a minimum temperature for a minimum period of 6 hours, the minimum temperature being above the melting point of the mixture and at least 200° C. An adduct of the Lewis acid and the Lewis base is formed.

The minimum temperature is preferably 250° C., values of 300° C., 350° C., 400° C., 450° C. and 500° C. being particularly preferred in this order. The minimum period is preferably 12 hours, values of 18, 24, 48 and 72 being particularly preferred in this order.

The fraction of aluminum in the starting mixture should be at least 40 mmol aluminum per mole of the Lewis acid, values of 200 and 400 mmol per mole of Lewis acid being further preferred in this order.

The Lewis acid is preferably $AlCl_3$. The Lewis base is preferably a chloride of the conductive salt, thus LiCl in the case of a lithium cell.

The starting substances are preferably used in particle form and well mixed before heating. The increase in temperature should take place slowly, mainly to avoid a rapid increase in pressure. In order to compensate for a possible increase in the gas pressure, the reaction vessel should be open at least at the start of the heating process, undesired ingress of external gases being favorably prevented by application of a vacuum or use of a liquid seal similar to a wash bottle. It may be favorable to remove solid contamination, in particular aluminum, by filtration (e.g. using a fiber glass filter cloth) at the end of the process. Filtration should take place at a temperature where the melt is sufficiently liquid to pass through the filter. On the other hand, the temperature should be low enough to avoid damage to the filter and any contamination of the melt caused thereby. A temperature of 250° C. has proven to be suitable in practice.

BRIEF DESCRIPTION OF THE DRAWINGS

The invention is described in more detail hereafter with reference to figures, exemplary embodiments and experimental results. The features described can be used individually or in combination to create preferred embodiments of the invention. In the figures.

DESCRIPTION

Figure 1:
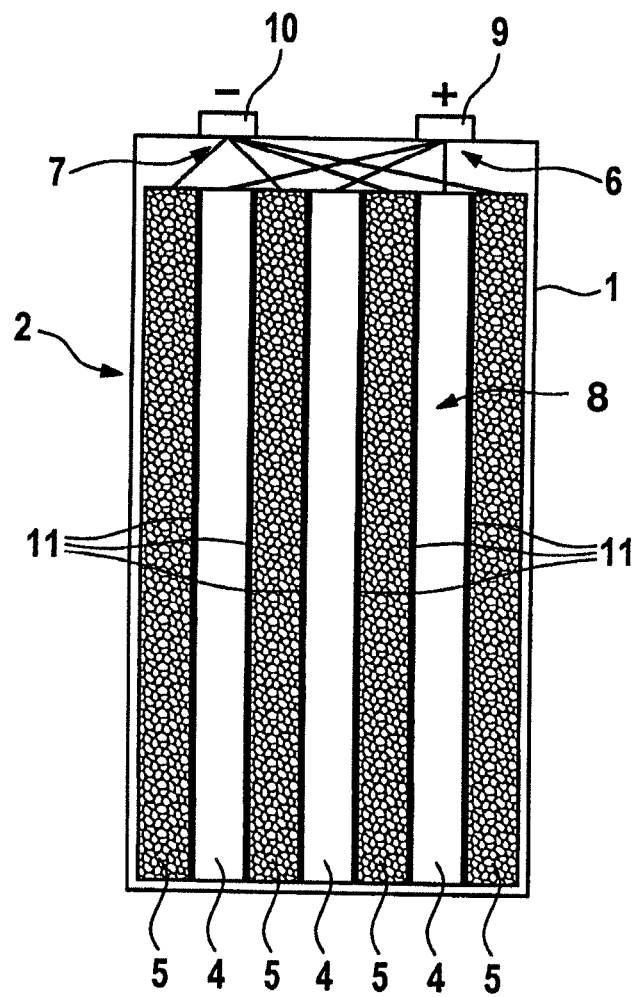
FIG. 1 shows a cross-sectional view of a battery cell according to the invention.

The housing 1 of the rechargeable battery cell 2 shown in FIG. 1 encloses an electrode arrangement comprising a plurality (three in the case shown) of positive electrodes 4 and a plurality (four in the case shown) of negative electrodes 5. The electrodes 4, 5 are connected in the usual manner with corresponding terminal contacts 9, 10 of the battery by means of electrode leads 6, 7. The cell is filled with an $SO_2$-based electrolyte 8 in such a manner that the electrolyte preferably penetrates completely into all pores, in particular inside the electrodes 4, 5. The electrolyte can be in liquid or gel form.

As is common, the electrodes 4, 5 have a planar shape, i.e. they are shaped as layers having a thickness which is small relative to their extension in the other two dimensions. The electrodes 4, 5 comprise in usual manner a current collector element which is made of metal and serves to provide the required electronically conductive connection of the active material of the respective electrode. The current collector element is in contact with the active material involved in the electrode reaction of the respective electrode. The electrodes are separated from each other by separators 11 in each case. The housing 1 of the prismatic cell shown is essentially cuboid, the electrodes and the walls shown in cross-section in FIG. 1 extending perpendicularly to the drawing plane and being essentially straight and flat. However, the cell according to the invention can also be designed as a spirally wound cell.

The negative electrodes 5 are preferably insertion electrodes, i.e. comprise an electrode material in which the ions of the active metal are inserted during charging of the cell and from which they are extracted during cell discharge. Preferably the negative electrodes contain carbon.

The active mass of the positive electrode is a component of the cell which changes its charge state as a result of the redox reaction that takes place at the positive electrode. In the cells according to the invention, the active mass of the positive electrode is preferably an intercalation compound into which the active metal can be inserted. Metal compounds are especially suitable (e.g. oxides, halogenides, phosphates, sulfides, chalcogenides, selenides), compounds of a transition metal being especially suitable, in particular an element of the atomic numbers 22 to 28, especially cobalt, nickel, manganese or iron, including mixed oxides and other mixed compounds of the metals. Lithium iron phosphate is particularly preferred. When such a cell is discharged, ions of the active metal are inserted in the positive active mass. For reasons of charge neutrality, this leads to an electrode reaction of the positive active mass at the electrode where an electron is transferred from a current collector element of the electrode to the positive active mass. The reverse process takes place during charging: the active metal (e.g. lithium) is extracted as an ion from the positive active mass and an electron is transferred from the latter to the current collector element of the positive electrode.

FIGS. 2 to 8 are based on the experimental testing of the invention.

Figure 2:
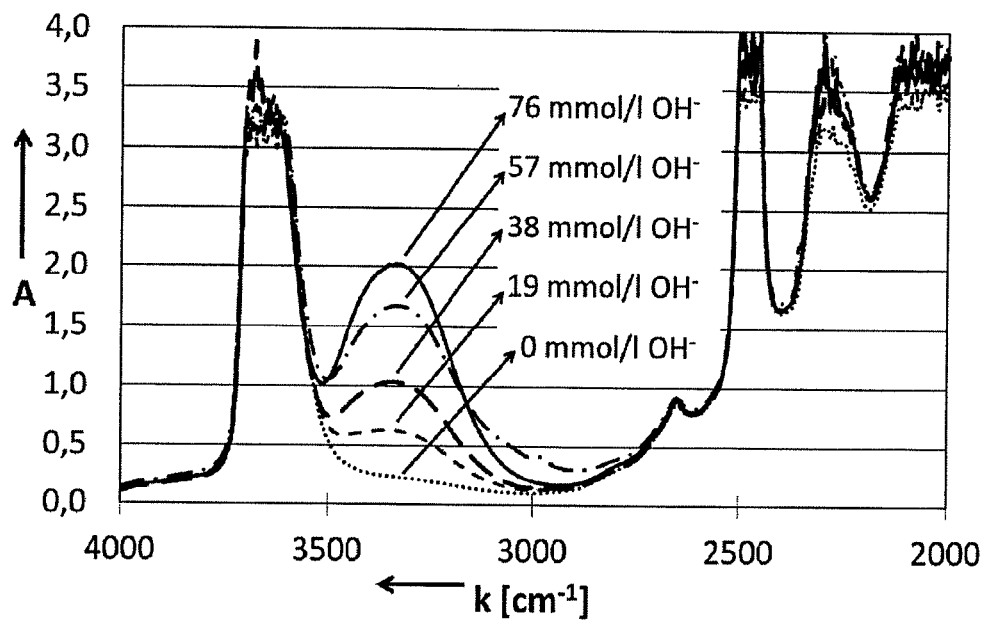
FIG. 2 shows FTIR spectra (transmission) of calibration electrolyte solutions with five different molar concentrations of hydroxide groups.

FIG. 2 shows FTIR spectra of calibration solutions with different molar concentrations of hydroxide groups. The absorbance A is shown as a function of the wavenumber k.

Suitable calibration solutions can be produced, for example, by adding a defined quantity of lithium chloride monohydrate to an electrolyte that does not show any OH absorption band, i.e. does not contain any hydroxide groups. Addition of 0.0604 g lithium chloride monohydrate increases the water content, and thus also the hydroxide group content of the calibration electrolyte, by 1 mmol.

Calibration electrolytes with different molar concentrations of hydroxide groups were analyzed by means of FTIR spectroscopy in the range of the absorption band of $OH^-$ (3300 $cm^{-1}$). FIG. 2 shows the spectra for the five molar concentrations of hydroxide groups stated in the graph.

Figure 3:
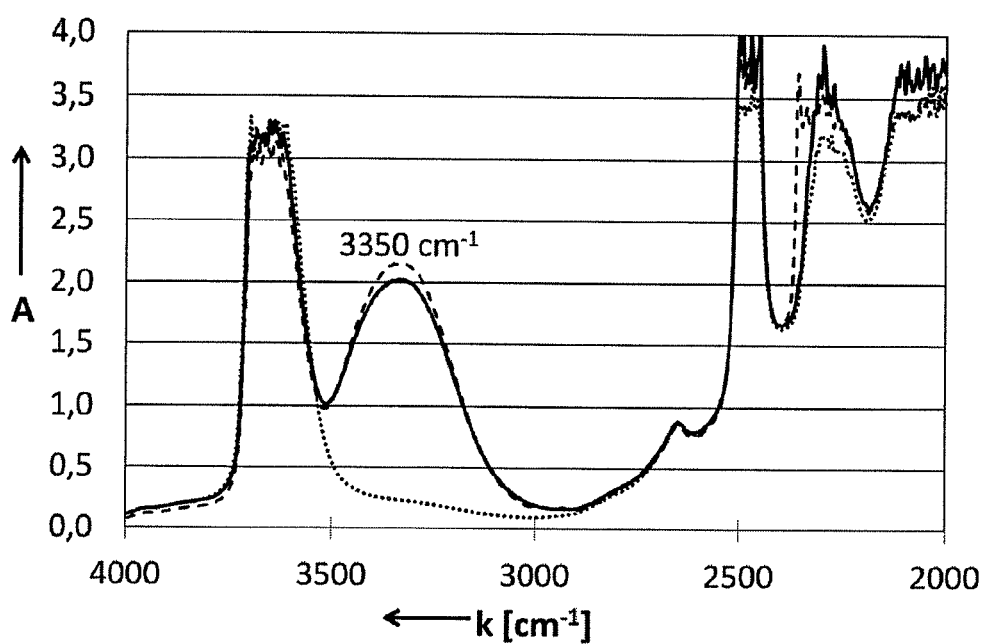
FIG. 3 shows FTIR spectra (transmission) of electrolytes with different molar concentrations of hydroxide groups.

FIG. 3 shows a representation corresponding to FIG. 2 wherein, in addition to the calibration curves for the molar hydroxide concentrations zero (dotted) and 76 mmol per liter (continuous line), the FTIR spectrum of an electrolyte is shown (dashed line) that was produced in accordance with the instructions of the document D3 cited above. The spectrum shows that the electrolyte produced according to this state of the art contained approximately 94 mmol per liter (corresponding to approx. 1000 ppm) of hydroxide groups. The above cited document D6 also states that an uncleaned electrolyte contains a hydroxide amount corresponding to this molar concentration.

Hydroxide-containing compounds have a detrimental effect on the electrochemical properties of a battery cell. The discharge capacity $Q_D$ specifies the charge capacity which can be extracted from a battery cell during discharge. Generally, $Q_D$ decreases from cycle to cycle during charging and discharging. The smaller this decrease, the longer is the service life of the battery.

Figure 4:
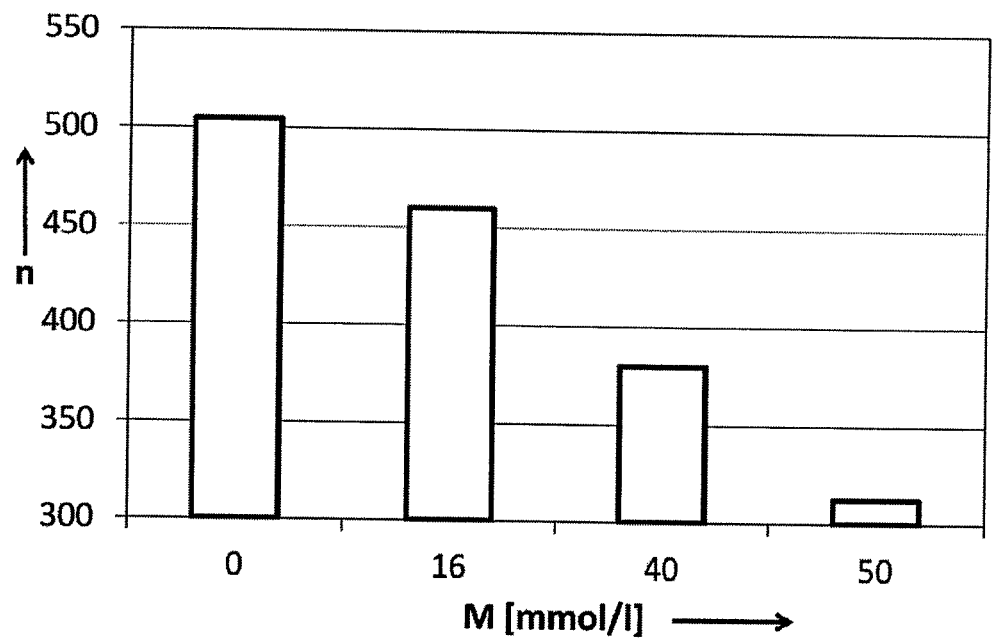
FIG. 4 shows a graphic representation of the dependence of the number of cycles at which a discharge capacity of 66.5% of the nominal capacity is reached for cells which contain different molar concentrations of hydroxide groups.

FIG. 4 shows the influence of the molar concentration of hydroxide groups on the decrease in capacity and thus on the service life of the battery cell. The graph is based on an experiment where battery cells with two negative carbon electrodes, an $SO_2$-based electrolyte with $LiAlCl_4$ as conductive salt and a positive electrode with lithium iron phosphate are charged and discharged over several hundred cycles. The nominal capacity of the cell was 100 mAh. Charging of the cells took place with 1 C, corresponding to a current of 100 mA up to an end-of-charge voltage 3.6 V and a drop in the charging current to 40 mA. After this, the cells were discharged with the same current until a potential of 2.5 V was reached. There was a pause of ten minutes in each case between charging and discharging.

FIG. 4 shows the number of charging and discharging cycles performed with the test cells until a defined minimum capacity (here 66.5% of the nominal capacity) was reached.

The hydroxide-free cell, which is represented by the left column, reached this value only after 500 cycles. In contrast, the other cells with a hydroxide content of 16 [obvious error in German text: "19"], 40 and 50 mmol/l achieved much lower numbers of cycles, the cell with a hydroxide content of 50 mmol/l achieving only approx. 300 cycles. Assuming, for example, that a battery cell is charged and discharged once daily and is to be used up to the specified discharge capacity, this means that the hydroxide-free cell has a service life of 1 year and 7 months, whereas the cell with a hydroxide content of 50 mmol/l can be used only for a period of 10 months.

Figure 5:
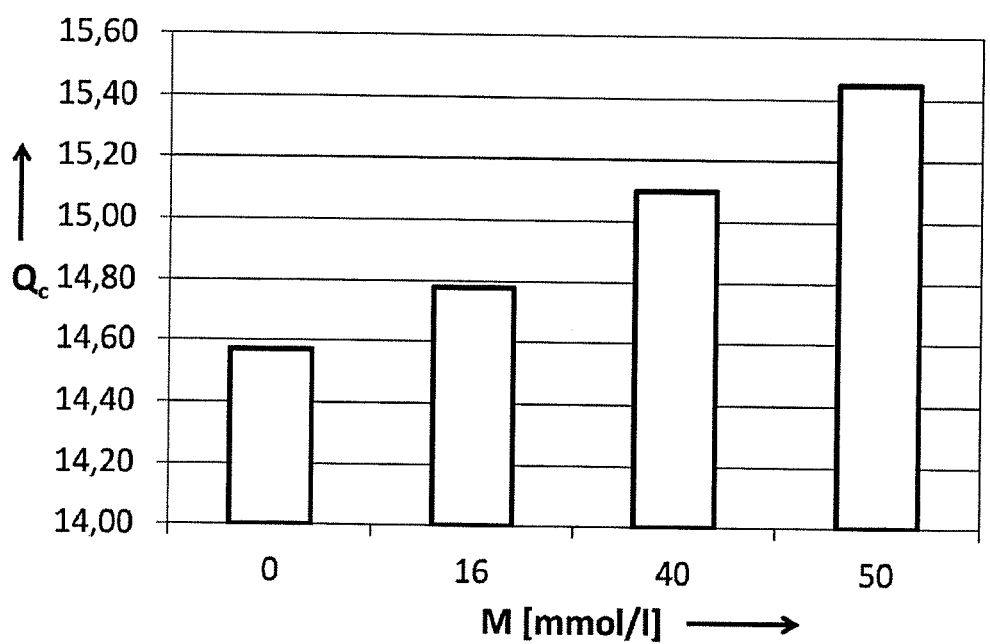
FIG. 5 shows a graphic representation of the capacity irreversibly consumed for formation of the covering layer on the electrodes for cells with different molar concentrations of hydroxide groups.

As already explained, hydroxide groups contained in the electrolyte of an electrochemical cell lead to a deterioration in the electrical data of said cell in so far as the charge quantity irreversibly consumed in the initial charging cycles for formation of an electrode covering layer ("covering layer capacity" $Q_C$) increases as a function of the molar concentration of hydroxide ions. The covering layer capacity $Q_C$ can be determined, for example, by comparing the charge and discharge capacities of the cell in the first cycle. FIG. 5 shows the results of such experiments. The covering layer capacity $Q_C$ (as a percentage of the theoretical charge capacity of the negative electrode) is shown as a function of the molar concentration M of hydroxide ions contained in four different electrolytes. It can be seen that the covering layer capacity is higher for a cell with 50 mmol/l than for a cell whose electrolyte does not contain any hydroxide ions. The useful discharge capacity of cells that do not contain any hydroxide is correspondingly higher.

Figure 6:
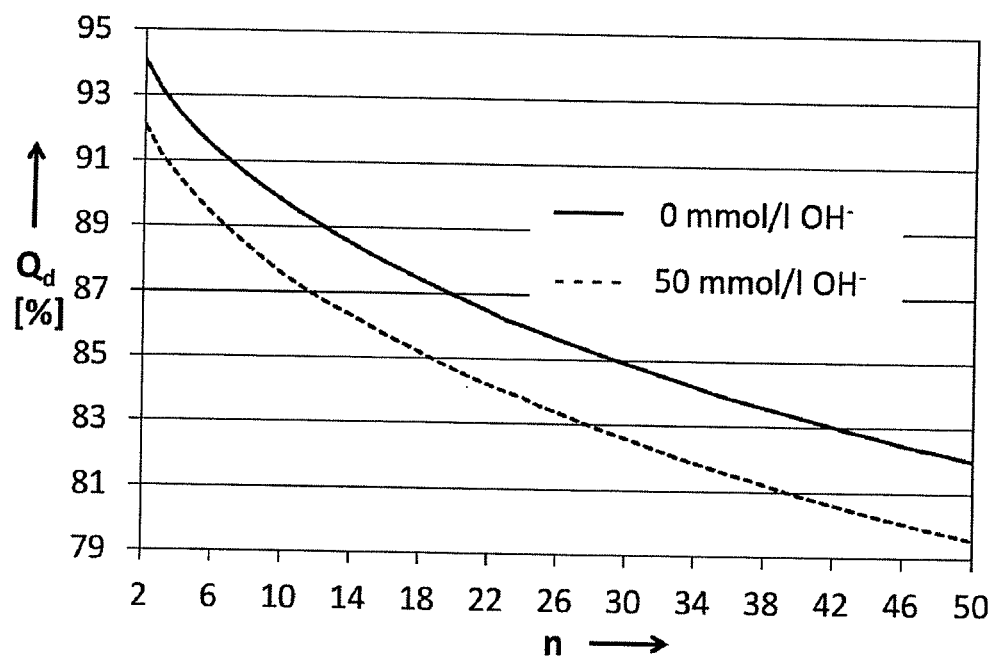
FIG. 6 shows a graphic representation of the discharge capacity as a function of the number of cycles of two cells with different molar concentrations of hydroxide groups in the electrolyte.

The effect is substantial since all following charging and discharging cycles for a hydroxide-containing cell start at a correspondingly lower level than with hydroxide-free cells. FIG. 6 shows the discharge capacity $Q_D$ as a percentage of the nominal capacity as a function of the number of charging and discharging cycles, the continuous curve showing the results with a hydroxide-free electrolyte and the dashed curve the results for an electrolyte with a molar concentration of hydroxide groups of 50 mmol/l.

As described above, different methods were tested in the past in order to remove hydroxide-containing contamination of the electrolyte and thus eliminate the associated disadvantages. It was established that the desired cleaning effect cannot be achieved by use of dried starting substances and/or heating the electrolyte. For this reason, chemical methods using chlorine or chlorine-containing substances were proposed (cf. D5 and D6). However, it was established in the context of the invention that the formation of chlorosulfonate groups in the electrolyte associated with such methods causes additional problems.

Figure 7:
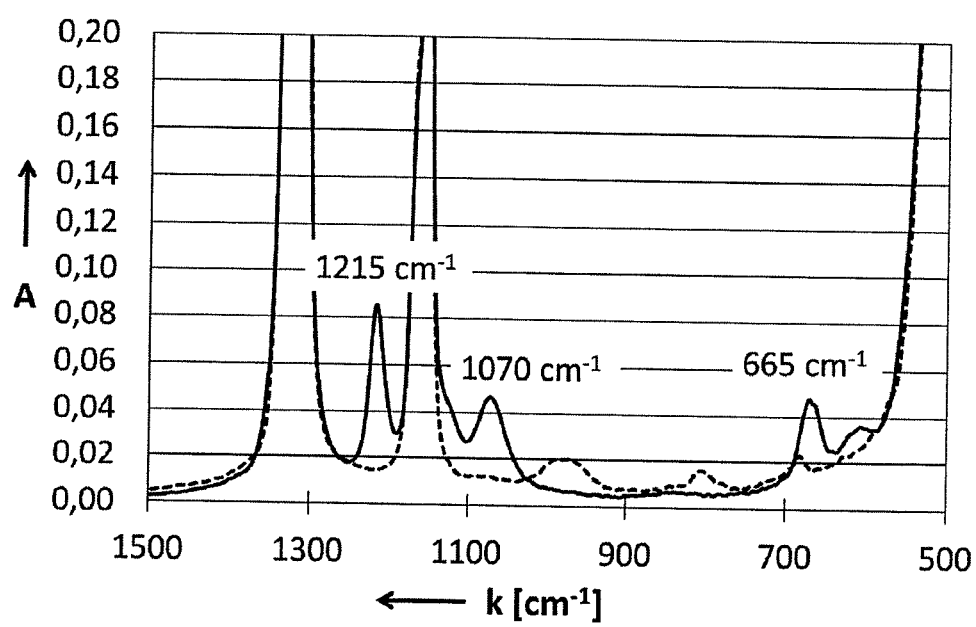
FIG. 7 shows an FTIR spectrum (ATR) of two electrolytes that contain different molar concentrations of chlorosulfonate groups.

FIG. 7 shows the FTIR spectrum (ATR), namely the absorbance A as a function of the wavenumber k, for two electrolyte solutions that contained no (dashed line) sulfonate groups and 290 mmol/l (continuous line) of sulfonate groups respectively. Three bands can be clearly seen at the wavenumbers 665 $cm^{-1}$, 1070 $cm^{-1}$ and 1215 $cm^{-1}$ which occur due to the presence of compounds containing chlorosulfonate groups.

Figure 8:
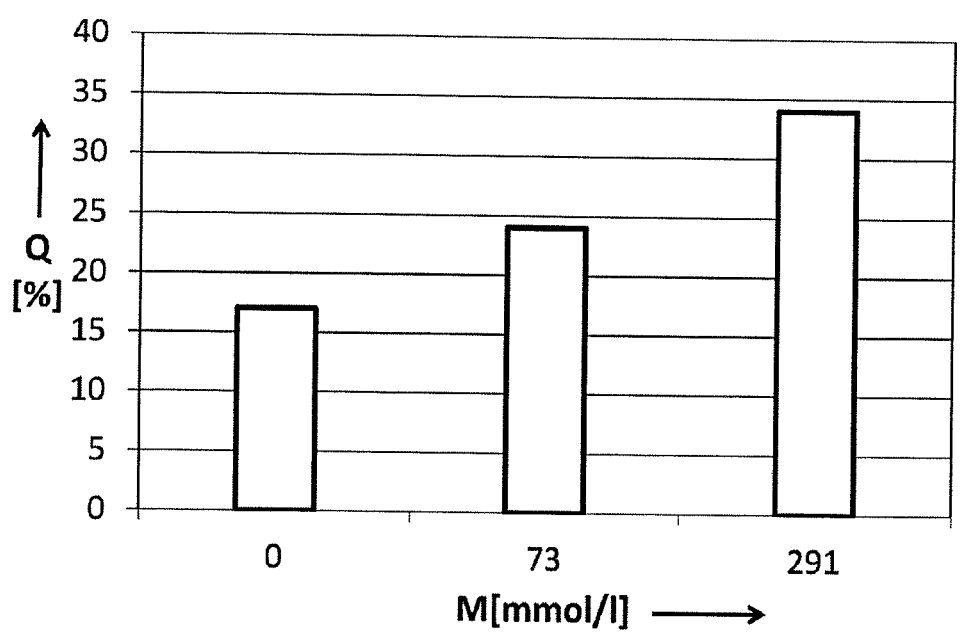
FIG. 8 shows a graphic representation of the relationship of the covering layer capacity and the discharge capacity for cells with different molar concentrations of chlorosulfonate groups in their electrolyte.

FIG. 8 shows the covering layer capacity $Q_C$ for cells whose electrolyte contained three different molar concentrations of chlorosulfonate groups. These measurements were performed as half-cell experiments in a three-electrode system (working electrode: carbon (graphite); counter electrode: lithium; reference electrode for currentless potential measurement: lithium). The electrodes were placed in a glass E-cell and filled with the electrolyte solution to be examined in each case. The left column shows the example of a cell with an electrolyte according to the invention, which was essentially free of hydroxide groups, but was simultaneously essentially free of chlorosulfonate groups. The covering layer capacity is only 17% here. The two other columns show the results for cells with 73 mmol/l and 291 mmol/l of chlorosulfonate groups. The higher the covering layer capacity, the lower is the discharge capacity. This means that the percentage relationship between the (irreversible and thus wasted) covering layer capacity $Q_C$ and the useful discharge capacity $Q_D$ is significantly worsened due to the chlorosulfonate content.

An electrolyte according to the invention can be produced, for example, by means of the following process:
a) Drying: Lithium chloride is dried under vacuum for three days at 120° C. Aluminum particles are dried under vacuum for two days at 450° C.
b) Mixing: 434 g (10.3 mol) LiCl, 1300 g (9.7 mol) AlCl$_3$ and 100 g (3.4 mol) Al are mixed well in a glass bottle with an opening that allows gas to escape. The quantities correspond to a mole ratio AlCl$_3$:LiCl:Al of 1:1.06:0.35.
c) Melting/heat treatment: The mixture is heat-treated as follows:
   Two hours at 250° C.;
   two hours at 350° C.;
   two hours at 500° C.;
   after 6 hours the opening of the bottle is closed;
   three days at 500° C.;
d) Cooling/filtering: After cooling to 250° C., the melt is filtered through a fiber glass cloth.
e) Addition of SO$_2$: The melt is cooled to room temperature after one day. The bottle with the melt is evacuated. SO$_2$ is supplied from a vessel that contains the SO$_2$ gas under pressure until the desired molar ratio of SO$_2$ to LiAlCl$_4$ is obtained. This can be checked by weighing. The bottle is cooled during supply of the SO$_2$, whereby the salt melt dissolves in the SO$_2$ and a liquid electrolyte according to the invention is obtained.

An adduct of the Lewis base LiCl and the Lewis acid AlCl$_3$ is formed by the described process. The excess LiCl means that the electrolyte contains free LiCl. This prevents formation of free AlCl$_3$. Generally, independently of the stated example, it is advantageous if the electrolyte contains free Lewis base in addition to the Lewis acid/Lewis base adduct. In other words, the mole ratio of the sum of the free Lewis base and the Lewis base contained in the Lewis acid/Lewis base adduct to the Lewis acid contained in the Lewis acid/Lewis base adduct should be greater than 1.

The invention claimed is:
1. An electrolyte for an electrochemical battery cell, containing sulfur dioxide and a conductive salt, wherein
   the molar concentration of hydroxide groups in the electrolyte is at most 50 mmol per liter, and wherein
   the molar concentration of chlorosulfonate groups in the electrolyte is at most 350 mmol per liter.
2. The electrolyte according to claim 1, wherein the molar concentration of hydroxide groups in the electrolyte is at most 45 mmol per liter.
3. The electrolyte according to claim 1, wherein the molar concentration of chlorosulfonate groups in the electrolyte is at most 250 mmol per liter.
4. The electrolyte according to claim 1, wherein the electrolyte contains at least 1 mol SO$_2$.
5. The electrolyte according to claim 1, wherein the conductive salt is a Lewis acid/Lewis base adduct and wherein the electrolyte contains free Lewis base.
6. The electrolyte according to claim 1, wherein the conductive salt is an aluminate, halogenide, oxalate, borate, phosphate, arsenate or gallate of an alkali metal.
7. The electrolyte according to claim 6, wherein the conductive salt is lithiumtetrachloroaluminate.
8. The electrolyte according to claim 1, wherein it contains, relative to the mole number of all salts dissolved in the electrolyte, at most 30 mol % of dissolved salt having a cation differing from the cation of the active metal.
9. An electrochemical battery cell containing an electrolyte according to claim 1, a positive electrode and a negative electrode.
10. The battery cell according to claim 9, wherein the active metal is an alkali metal, an alkaline earth metal, a metal of group 12 of the periodic table or aluminum.
11. The battery cell according to claim 10, wherein the active metal is lithium, sodium, calcium, zinc or aluminum.
12. The battery cell according to claim 9, wherein the negative electrode is an insertion electrode.
13. The battery cell according to claim 12, wherein the negative electrode contains carbon.
14. The battery cell according to claim 9, wherein the positive electrode contains a metal compound.
15. The battery cell according to claim 14, wherein the positive electrode contains an intercalation compound.
16. The battery cell according to claim 15, wherein the positive electrode contains lithium iron phosphate.

* * * * *